(12) United States Patent
Urabe et al.

(10) Patent No.: US 9,656,410 B2
(45) Date of Patent: May 23, 2017

(54) FILM MANUFACTURING METHOD, FILM MANUFACTURING DEVICE, AND JIG

(71) Applicant: KANEKA CORPORATION, Osaka-shi, Osaka (JP)

(72) Inventors: Takashi Urabe, Shiga (JP); Hisayasu Kaneshiro, Shiga (JP); Koji Hanada, Shiga (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/648,106

(22) PCT Filed: Nov. 28, 2013

(86) PCT No.: PCT/JP2013/082038
§ 371 (c)(1),
(2) Date: May 28, 2015

(87) PCT Pub. No.: WO2014/084306
PCT Pub. Date: Jun. 5, 2014

(65) Prior Publication Data
US 2015/0336293 A1     Nov. 26, 2015

(30) Foreign Application Priority Data

Nov. 29, 2012   (JP) ................................. 2012-261111

(51) Int. Cl.
*B29C 47/16* (2006.01)
*B29B 11/00* (2006.01)
(Continued)

(52) U.S. Cl.
CPC .............. *B29B 11/00* (2013.01); *B29C 47/16* (2013.01); *B29C 47/0021* (2013.01);
(Continued)

(58) Field of Classification Search
CPC ... B29B 11/00; B29L 2007/008; B29C 47/16; B29C 47/0021; B29C 47/0808; B29K 2079/085
See application file for complete search history.

(56) References Cited

U.S. PATENT DOCUMENTS 3,293,689 A      12/1966   Chiselko et al.
3,320,634 A  *    5/1967   Ryan ...................... B29C 47/14
                                                          425/190

(Continued)

FOREIGN PATENT DOCUMENTS

CN          2475549         2/2002
CN        101080471        11/2007
(Continued)

OTHER PUBLICATIONS

Office Action for corresponding application JP 2014-549889, mailed Apr. 7, 2015, with full English translation.

*Primary Examiner* — Jeffrey Wollschlager
(74) *Attorney, Agent, or Firm* — Kagan Binder, PLLC (57) ABSTRACT

A film is formed by extruding a resin from a lip opening (3) of a multilayer extrusion die (1) in a state in which a rectifying jig (10) does not cover the lip opening (3) but covers a seal part (6) while being located adjacent to each end in a longer side direction of the lip opening (3).

8 Claims, 5 Drawing Sheets

(51) Int. Cl.
*B29L 7/00* (2006.01)
*B29K 79/00* (2006.01)
*B29C 47/00* (2006.01)
*B29C 47/08* (2006.01)

(52) U.S. Cl.
CPC .... *B29C 47/0808* (2013.01); *B29K 2079/085* (2013.01); *B29L 2007/008* (2013.01)

(56) References Cited

U.S. PATENT DOCUMENTS

| | | | | |
|---|---|---|---|---|
| 3,611,491 | A * | 10/1971 | Rector | B29C 47/16 425/380 |
| 3,694,132 | A * | 9/1972 | Bunte | B29C 47/14 425/466 |
| 3,706,518 | A * | 12/1972 | Bunte | B29C 47/14 425/381 |
| 3,711,235 | A * | 1/1973 | Bunte | B29C 47/14 425/466 |
| 3,832,120 | A * | 8/1974 | Shaffer | B29C 47/14 425/381 |
| 3,870,454 | A * | 3/1975 | Penrod | B29C 47/14 425/378.1 |
| 3,941,551 | A * | 3/1976 | Marion | B29C 47/0047 425/379.1 |
| 4,348,346 | A * | 9/1982 | Thompson | B29C 47/0021 264/146 |
| 4,659,302 | A * | 4/1987 | Maejima | B29C 47/16 264/177.1 |
| 4,863,361 | A * | 9/1989 | Boos | B29C 47/0019 264/176.1 |
| 5,451,357 | A * | 9/1995 | Cloeren | B29C 47/062 264/173.16 |
| 5,505,609 | A * | 4/1996 | Cloeren | B29C 47/0021 264/169 |
| 5,830,391 | A * | 11/1998 | Lamkemeyer | B29C 47/0808 264/176.1 |
| 2004/0063900 | A1* | 4/2004 | Kaneshiro | B29C 41/28 528/353 |
| 2008/0138637 | A1 | 6/2008 | Yanagida et al. | |
| 2008/0296807 | A1* | 12/2008 | Abiru | B29C 41/26 264/309 |
| 2008/0305346 | A1* | 12/2008 | Yanagida | B32B 15/08 428/473.5 |
| 2009/0104465 | A1 | 4/2009 | Yanagida et al. | |
| 2011/0206795 | A1* | 8/2011 | Ulcej | B29C 47/0021 425/232 |
| 2013/0122131 | A1* | 5/2013 | Sedivy | B29C 47/0816 425/150 |

FOREIGN PATENT DOCUMENTS

| | | |
|---|---|---|
| CN | 101389459 | 3/2009 |
| JP | 52-033658 | 8/1977 |
| JP | 60-67129 | 4/1985 |
| JP | 62-114717 | 7/1987 |
| JP | 03-284926 | 12/1991 |
| JP | 05-38477 | 2/1993 |
| JP | 06-198707 | 7/1994 |
| JP | 8-052783 | 2/1996 |
| JP | 08-12158 | 4/1996 |
| JP | 08-142158 | 6/1996 |
| JP | 9-201866 | 5/1997 |
| JP | 10-119114 | 5/1998 |
| JP | 11-077796 | 3/1999 |
| JP | 2000-15683 | 1/2000 |

\* cited by examiner

FILM MANUFACTURING METHOD, FILM MANUFACTURING DEVICE, AND JIG

This application claims benefit from International Application No. PCT/JP2013/082038, which was filed on Nov. 28, 2013, which in turn claims priority to Japanese Application No. 2012-261111, which was filed on Nov. 29, 2012, wherein the entireties of said patent applications are incorporated herein by reference.

TECHNICAL FIELD

The present invention relates to a method, a film manufacturing apparatus, and a jig each for manufacturing a film such as a multilayer polyimide film.

BACKGROUND ART

A manufacturing apparatus which manufactures a film such as a multilayer polyimide film uses an extrusion die which continuously extrudes a liquid resin film such as polyamide acid, which is formed into a film, in a predetermined width and a predetermined thickness. In the extrusion die, a seal part (packing) may be provided in a space between (i) an end in a width direction of a lip opening, the width direction corresponding to a width direction of the film (hereinafter referred to as a "lip edge") and (ii) an end plate so as to prevent a leakage of a liquid resin.

However, there may appear a gap or a level difference (groove) between the lip edge and the end plate due to a small variation (individual difference) in size, thickness, and shape of the seal part, and an error occurring while the seal part is being provided. In other words, the lip edge, the seal part, and the end plate cannot be flush with each other. When a gap or a level difference appears in a space between the lip edge and the end plate, a pool of a liquid resin is easily produced in the space. This makes a flow of the liquid resin unstable and thus causes each end of the liquid resin film to be unstable in shape and thickness. The liquid resin thus having pooled cures to be agglomerate, and the agglomerate may adhere as a foreign matter to the liquid resin film to be extruded from the lip opening.

In a case where a film is manufactured while a gap or a level difference remains between the lip edge and the end plate, it is difficult to stably and continuously produce a film, which may deteriorate in quality. This requires a method for making the each end of the liquid resin film stable in shape and thickness.

There have been proposed various techniques for changing an ejection width of a resin film, which is to be a thermoplastic resin film, during continuous production by providing, at a lip edge of an extrusion die, an ejection width changing section such as an outer deckle so that the ejection width changing section covers a part of the lip edge (see Patent Literatures 1 through 8).

CITATION LIST

Patent Literatures

Patent Literature 1
Japanese Patent Application Publication, Tokukaihei, No. 10-119114 (Publication Date: May 12, 1998)
Patent Literature 2
Japanese Patent Application Publication, Tokukaihei, No. 06-198707 (Publication Date: Jul. 19, 1994)
Patent Literature 3
Japanese Patent Application Publication, Tokukaihei, No. 03-284926 (Publication Date: Dec. 16, 1991)
Patent Literature 4
Japanese Patent, Tokukosho, No. 52-033658 (Publication Date: Aug. 30, 1977)
Patent Literature 5
Japanese Patent Application Publication, Tokukaihei, No. 08-052783 (Publication Date: Feb. 27, 1996)
Patent Literature 6
Japanese Patent Application Publication, Tokukaihei, No. 11-077796 (Publication Date: Mar. 23, 1999)
Patent Literature 7
Japanese Unexamined Utility Model (Registration) Application Publication, Jitsukaisho, No. 62-114717 (Publication Date: Jul. 21, 1987)
Patent Literature 8
U.S. Pat. No. 3,293,689 (Publication Date: Dec. 27, 1966)

SUMMARY OF INVENTION

Technical Problem

The techniques disclosed in Patent Literatures 1 through 8 each make it possible to change a width of a liquid resin film by providing an outer deckle (stopping board) at one or each end of a lip opening of a die for molding an extruded film. However, according to the techniques, a part of the lip opening of the die for molding an extruded film is covered. This causes a liquid resin to pool in the part, so that each end of a film is highly likely to be unstable in shape and thickness.

This requires a film manufacturing method which, by making each end of a liquid resin film stable in shape and thickness, enables stable and continuous production of a film while maintaining a quality of the film.

The present invention has been achieved in view of the problems, and a main object of the present invention is to provide (i) a film manufacturing method, (ii) a film manufacturing apparatus, and (iii) a jig each of which, by making each end of a liquid resin film stable in shape and thickness, enables stable and continuous production of a film while maintaining a quality of the film.

Solution to Problem

A film manufacturing method according to the present invention is a film manufacturing method using a film manufacturing apparatus, the film manufacturing apparatus including: (1) an extrusion die having a feed opening for supplying a resin and a lip opening for ejecting the supplied resin in a form of a film; (2) an end plate which is provided at each end in a longer side direction of the lip opening of the extrusion die and serves as a sidewall of the lip opening; and (3) a seal part which is provided between the extrusion die and the end plate. The film manufacturing method according to the present invention includes: an extrusion step of, in a state in which a jig is mounted on the end plate so as not to cover the lip opening but to cover the seal part while being located adjacent to the each end in the longer side direction of the lip opening, extruding the resin from the lip opening so as to form the film.

According to the configuration, the jig which is mounted on the end plate does not cover the lip opening but covers the seal part while being located adjacent to the each end in the longer side direction of the lip opening. Therefore, no pool of the liquid resin is produced in a part of the lip opening, the pool being produced by covering the part. Since the jig covers the seal part while being located adjacent to the each end in the longer side direction of the lip opening, it is possible for the jig to cover a gap or a level difference appearing at, for example, the seal part. Therefore, each end of a liquid resin film extruded from the extrusion die can be made stable in behavior. That is, the each end of the liquid resin film can be made stable in shape and thickness.

Therefore, the configuration makes it possible to provide a film manufacturing method which enables stable and continuous production of a film while maintaining a quality of the film.

The film manufacturing method is favorably configured such that the jig has a tip that faces the lip opening, the tip being located at the each end of the lip opening. The film manufacturing method is favorably configured such that the jig has a tip that faces the lip opening, the tip having a width that is not less than a length in a shorter side direction of the lip opening and not more than 10 mm. This allows the jig to cover the seal part without fail.

The film manufacturing method is favorably configured such that the jig has a first outer surface that faces the end plate and a second outer surface that is opposite to the first outer surface and has a rounded part so as to be closer to the lip opening, the rounded part having a radius of curvature R of more than 0 mm and not more than 10 mm. This allows the liquid resin film which is ejected from the extrusion die to be gradually away from an outer surface of the jig as the ejection from the lip opening is greater in distance. Accordingly, each end of the liquid resin film can be made more stable in behavior.

The film manufacturing method is favorably configured such that the resin is at least one resin selected from the group consisting of a polyimide solution, a polyamide imide solution, and a polyamide acid solution which is a precursor of polyimide. Further, the film manufacturing method is favorably configured such that: the resin is the polyamide acid solution which is a precursor of polyimide; and the polyamide acid solution contains a chemical imidization agent.

The film manufacturing method may be configured such that: the extrusion die has a plurality of resin flow paths from the feed opening to the lip opening; and in the extrusion step, a multilayer resin film is formed by supplying the resin separately to each of the plurality of resin flow paths, causing the separately supplied resin to flow together, and ejecting the resin from the lip opening.

Alternatively, the film manufacturing method according to the present invention may be configured such that: the extrusion die has three resin flow paths from the feed opening to the lip opening; and in the extrusion step, a resin film having a three-layer structure is formed by supplying, to one of the three resin flow paths which one is inner than the other two resin flow paths, a polyamide acid solution which is a precursor of non-thermoplastic polyimide, and by supplying, to the other two resin flow paths which are outer than the one of the three resin flow paths, a polyamide acid solution which is a precursor of thermoplastic polyimide.

In order to attain the object, a film manufacturing apparatus according to the present invention includes: an extrusion die having a feed opening for supplying a resin and a lip opening for ejecting the supplied resin in a form of a film; an end plate which is provided at each end in a longer side direction of the lip opening of the extrusion die and serves as a sidewall of the lip opening; a seal part which is provided between the extrusion die and the end plate; and a jig which is mounted on the end plate so as not to cover the lip opening but to cover the seal part while being located adjacent to the each end in the longer side direction of the lip opening.

The film manufacturing apparatus according to the present invention is favorably configured such that the jig is mounted on the end plate so as to be movable in the longer side direction of the lip opening. Alternatively, the film manufacturing apparatus according to the present invention may be configured such that wherein the jig has a tip that faces the lip opening, the tip being located at the each end of the lip opening. The film manufacturing apparatus according to the present invention is favorably configured such that the jig has a first outer surface that faces the end plate and a second outer surface that is opposite to the first outer surface and has a rounded part so as to be closer to the lip opening, the rounded part having a radius of curvature R of more than 0 mm and not more than 10 mm. The film manufacturing apparatus according to the present invention is favorably configured such that the jig has a tip that faces the lip opening, the tip having a width that is not less than a length in a shorter side direction of the lip opening and not more than 10 mm.

A jig according to the present invention is a jig which is provided in a film manufacturing apparatus, the film manufacturing apparatus including: (1) an extrusion die having a feed opening for supplying a resin and a lip opening for ejecting the supplied resin in a form of a film; (2) an end plate which is provided at each end in a longer side direction of the lip opening of the extrusion die and serves as a sidewall of the lip opening; and (3) a seal part which is provided between the extrusion die and the end plate. The jig according to the present invention has: a first outer surface in which a line segment having a length that is not less than a length in a shorter side direction of the lip opening and not more than 10 mm is a part of an outer periphery of the jig, and which has a length in a direction perpendicular to the line segment of not less than a thickness of the seal part; and a second outer surface which is opposite to the first outer surface, the second outer surface having a rounded part so as to be closer to the line segment, and the rounded part having a radius of curvature R of more than 0 mm and not more than 10 mm.

The configuration makes it possible to provide a film which is manufactured stably and continuously and has a good quality.

Advantageous Effects of Invention

A manufacturing method according to the present invention, for example brings about an advantageous effect of providing (i) a film manufacturing method, (ii) a film manufacturing apparatus, and (iii) a jig each of which enables stable and continuous production of a film while maintaining a quality of the film.

DESCRIPTION OF EMBODIMENTS

A film manufacturing method according to the present invention is a film manufacturing method using a film manufacturing apparatus, the film manufacturing apparatus including: an extrusion die having a feed opening for supplying a resin and a lip opening for ejecting the supplied resin in a form of a film; an end plate which is provided at each end in a longer side direction of the lip opening of the extrusion die and serves as a sidewall of the lip opening; and a seal part which is provided between the extrusion die and the end plate, the film manufacturing method including: an extrusion step of, in a state in which a jig is mounted on the end plate so as not to cover the lip opening but to cover the seal part while being located adjacent to the each end in the longer side direction of the lip opening, extruding the resin from the lip opening so as to form the film.

A manufacturing method according to the present invention, which manufacturing method is a multilayer film manufacturing method using an extrusion die, is configured such that a rectifying jig for a multilayer film is provided at each end in a width direction of a lip opening of the extrusion die, the width direction corresponding to a width direction of a multilayer film. The manufacturing method can also be more favorably configured such that the rectifying jig, which can be positionally adjusted with respect to the each end, causes a tip of the rectifying jig which tip faces the lip opening to coincide with the each end of the lip opening.

Note that the "rectifying jig" herein refers to a jig which is provided on an outside of an end in a width direction of a lip opening of an extrusion die, the width direction corresponding to a width direction of a multilayer film, and which stabilizes behavior at each end of a liquid resin film by adjusting a flow of a liquid resin to be extruded from the extrusion die.

An embodiment of the present invention is described below with reference to FIGS. 1 through 7. Note, however, that the present invention, which is not limited to the embodiment described below, can be worked in an aspect obtained by various modifications within the scope described herein.

[Film Manufacturing Apparatus and Rectifying Jig]

First, a film manufacturing apparatus is described with reference to FIGS. 1 through 7. A film manufacturing apparatus according to the present invention is an apparatus which uses an extrusion die having a feed opening for supplying a resin and a lip opening for ejecting the supplied resin in a form of a film. The extrusion die according to the present invention, which extrusion die is not limited in number of resin flow paths from the feed opening to the lip opening, may include one resin flow path so as to form a monolayer film, or may include a plurality of resin flow paths so as to form a multilayer film. For example, a resin film having an outside and an inside that differ in characteristic are favorably formed by using an extrusion die having a plurality of resin flow paths from a feed opening to a lip opening, supplying a resin separately to each of the plurality of resin flow paths, causing the separately supplied resin to flow together, and ejecting the resin from the lip opening. The following description takes, as an example, a case where a film is a multilayer film having a three-layer structure.

Figure 1:
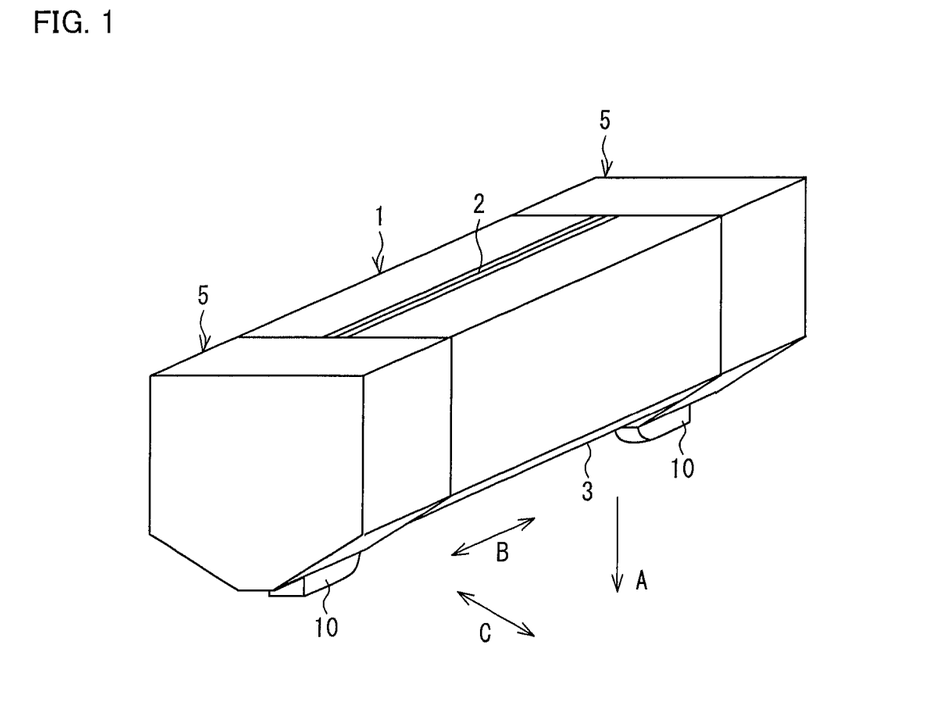
FIG. 1 is a perspective view of an example of a film manufacturing apparatus according to the present invention.

FIG. 1 is a perspective view of an appearance of a film manufacturing apparatus according to the present embodiment. The film manufacturing apparatus includes a multilayer extrusion die 1, end plates 5, and rectifying jigs 10 (see FIG. 1).

The multilayer extrusion die 1 includes a pair of outer plates, a pair of inner plates provided between the pair of outer plates, and a fixing member for fixing the pair of outer plates and the pair of inner plates. A gap between the pair of inner plates, a gap between one of the pair of inner plates and one of the pair of outer plates, and a gap between the other of the pair of inner plates and the other of the pair of outer places are each a flow path (resin flow path) through which a resin passes. The multilayer extrusion die 1 further includes a feed opening 2 to which a plurality of kinds of liquid resins are continuously supplied from a reactor (not illustrated). The feed opening 2 is an open end provided in an upper part of a gap between the pair of outer plates. The multilayer extrusion die 1 includes a lip opening 3 which is slit-shaped, causes a plurality of kinds of liquid resins to flow together, and continuously extrudes the plurality of kinds of liquid resins in a predetermined width and a predetermined thickness. The lip opening 3 is an open end provided in a lower part of the gap between the pair of outer plates.

The feed opening 2 is supplied with a liquid resin a which is formed into a thermosetting resin (non-thermoplastic resin) film and a liquid resin b which is formed into a thermoplastic resin film. The supplied liquid resin a moves to the lip opening 3 via a resin flow path provided between the pair of inner plates. The supplied liquid resin b moves to the lip opening 3 via a resin flow path provided between an inner plate and an outer plate. Therefore, the liquid resin a and the liquid resin b continuously flow in the multilayer extrusion die 1 from the feed opening 2 toward the lip opening 3 (in an arrow A direction in FIG. 1).

Note that the multilayer extrusion die 1 includes a temperature adjusting mechanism for adjusting respective temperatures of the supplied liquid resin a and the supplied liquid resin b. Note also that the multilayer extrusion die 1 includes a lip thickness adjusting mechanism for adjusting a length in a shorter side direction of the lip opening 3 which is slit-shaped (that is, the length is a thickness of the lip opening 3 and a width in an arrow C direction in FIG. 1), i.e., for adjusting a thickness of a multilayer film to be manufactured.

The thickness of the lip opening 3 (the width in the arrow C direction in FIG. 1) is appropriately set in accordance with the thickness of the multilayer film to be manufactured. Normally, the thickness is approximately from 500 μM to 2000 μm. The width of the lip opening 3 which width corresponds to a width direction of the multilayer film (a length in an arrow B direction in FIG. 1, that is, a length in a longer side direction of the lip opening 3 which is slit-shaped) is appropriately set in accordance with a width of the multilayer film to be manufactured. Normally, the width of the lip opening 3 is approximately from 300 mm to 3000 mm. Therefore, the multilayer extrusion die 1 is configured to continuously extrude a liquid resin film in a predetermined width and a predetermined thickness that have been set, the liquid resin film having a three-layer structure in which a liquid resin film made of the liquid resin a is sandwiched between liquid resin films made of the liquid resin b.

The end plates 5 which are paired and serve as sidewalls of the lip opening 3 are provided at respective both ends of the multilayer extrusion die 1, that is, respective both ends in a width direction of the multilayer extrusion die 1, the width direction corresponding to the width direction of the multilayer film (the arrow B direction in FIG. 1, that is, the longer side direction of the lip opening 3 which is slit-shaped). In other words, each of the end plates 5 serves as a sidewall of a resin flow path in the multilayer extrusion die 1. A seal part (packing) 6 is provided between the multilayer extrusion die 1 and an end plate 5 (see FIG. 2) so as to prevent, from an outside of a corresponding one of the ends, a leakage from that end of the liquid resin a and the liquid resin b. The seal part 6 only needs to be a material which is inert toward the liquid resin a and the liquid resin b and to which the liquid resin a and the liquid resin b are difficult to adhere. For example, the seal part 6 is suitably made of fluororesin. Note that the seal part 6 may be made of one kind of material or may be made of a plurality of kinds of materials which are combined (stacked).

Note, however, that according to the film manufacturing apparatus having the above configuration, there are a variation (individual difference) in size, thickness, and shape of the seal part 6, and an error occurring while the seal part 6 is being provided. Thus, in a case where the seal part 6 is provided so as not to protrude from a surface of the multilayer extrusion die 1 and a surface of the end plate 5, a gap (or a level difference (groove)) 6a appears in a space between the multilayer extrusion die 1 and the end plate 5 (see FIG. 2). In other words, according to the film manufacturing apparatus having the above configuration, the surface of the multilayer extrusion die 1, the surface of the end plate 5, and an end surface of the seal part 6 are not flush with each other.

Therefore, according to the film manufacturing apparatus having the above configuration, the rectifying jigs 10 are mounted on the respective end plates 5 (see FIG. 1).

Figure 3:
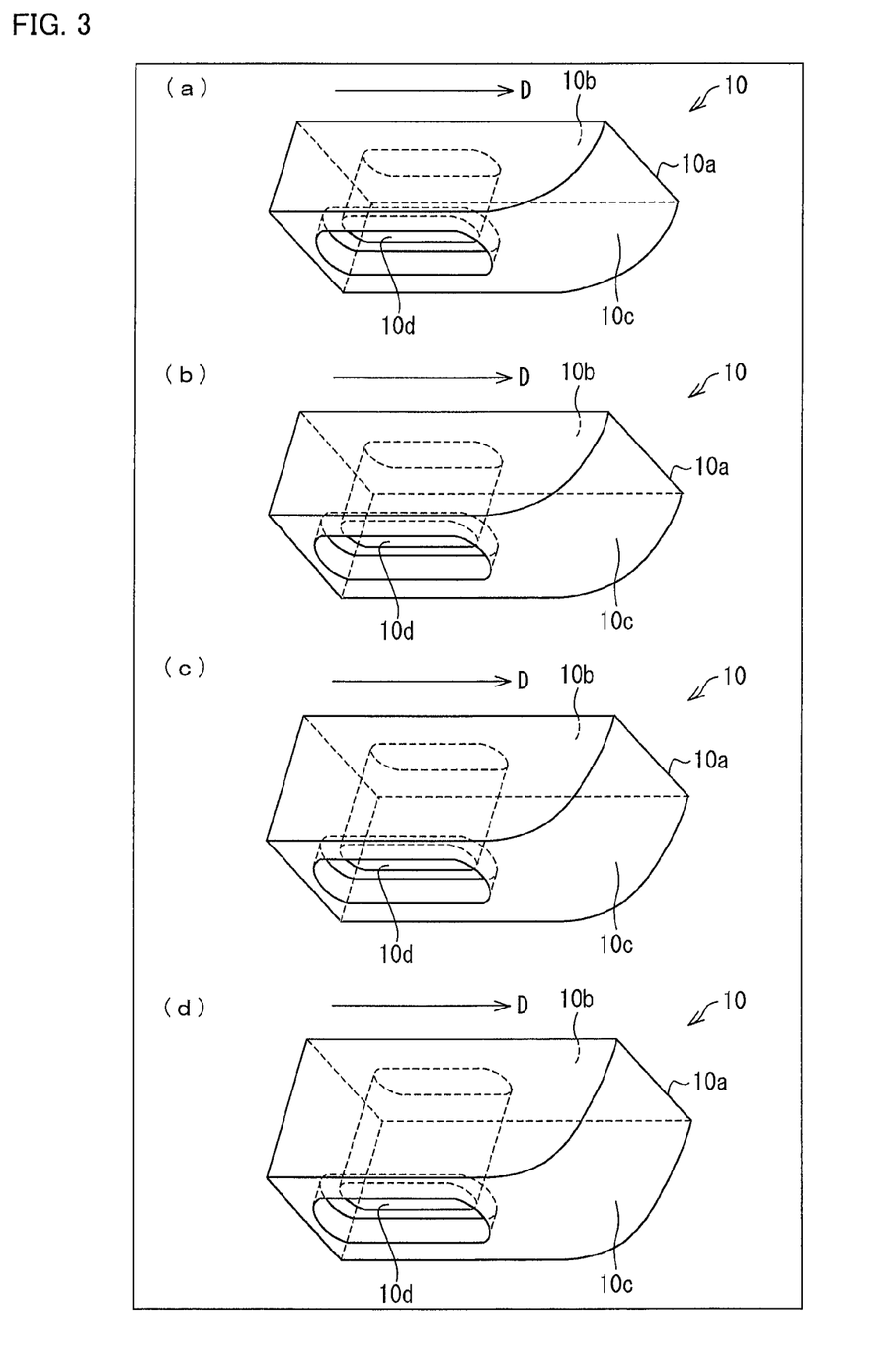
FIG. 3, which has perspective views of rectifying jigs each of which is included in the film manufacturing apparatus, shows four examples of the rectifying jigs having different radii of curvature of rounded parts on bottom surfaces of the rectifying jigs.

(a), (b), (c), and (d) of FIG. 3 are each a perspective view of a rectifying jig 10. The rectifying jig 10 is made of a metal such as stainless steel. The rectifying jig 10 has, as a part of a surface (outer surface) thereof, an upper surface 10b which can be in close proximity to the surface of the end plate 5, and a lower surface (second outer surface) 10c opposite to the upper surface (first outer surface) 10b. Note that the upper surface 10b, which is a planar surface in the present embodiment, is not limited to the planar surface. The upper surface 10b can have any shape provided that upper surface 10b can be in close proximity to the surface of the end plate 5.

The lower surface 10c has a rounded part so as to be closer to the upper surface 10b in a predetermined direction (arrow D direction in FIG. 3), and meets the upper surface 10b. A tip 10a where the upper surface 10b and the lower surface 10c meet each other is a line segment which is orthogonal to the arrow D direction. The tip 10a is formed so as to have a width (a length which is parallel to the upper surface 10b and is perpendicular to the arrow D direction) that is not less than the thickness of the lip opening 3 which thickness corresponds to a thickness direction of the multilayer film (that is, the length in the shorter side direction of the lip opening 3) and not more than 10 mm. The rectifying jig 10, which only needs to have a length (the length in the arrow D direction in FIG. 3) that is greater than a thickness of the seal part 6, may have a length of, for example, approximately 5 mm to 25 mm. In other words, in the upper surface 10b of the rectifying jig 10, a line segment (the tip 10a) having a length that is not less than the length in the shorter side direction of the lip opening 3 and not more than 10 mm is a part of an outer periphery of the rectifying jig 10, and the upper surface 10b of the rectifying jig 10 has a length in a direction perpendicular to the line segment of not less than the thickness of the seal part 6. Note that a height of the rectifying jig 10 (a maximum distance between the upper surface 10b and the lower surface 10c in a vertical direction, that is, a height of a left end of the rectifying jig 10 in FIG. 3) is not particularly limited, and may be set appropriately.

The lower surface 10c of the rectifying jig 10 is formed so as to have a rounded part whose radius of curvature R is more than 0 mm and not more than 10 mm. (a), (b), (c), and (d) of FIG. 3 show examples of the rectifying jigs 10 different in radius of curvature R. In FIG. 3, the radius of curvature R is greater in the order of (d), (c), (b), and (a).

The rectifying jig 10 is provided with a long hole 10d which is through from the lower surface 10c to the upper surface 10b and in which the arrow D direction is a longer side direction.

Figure 4:
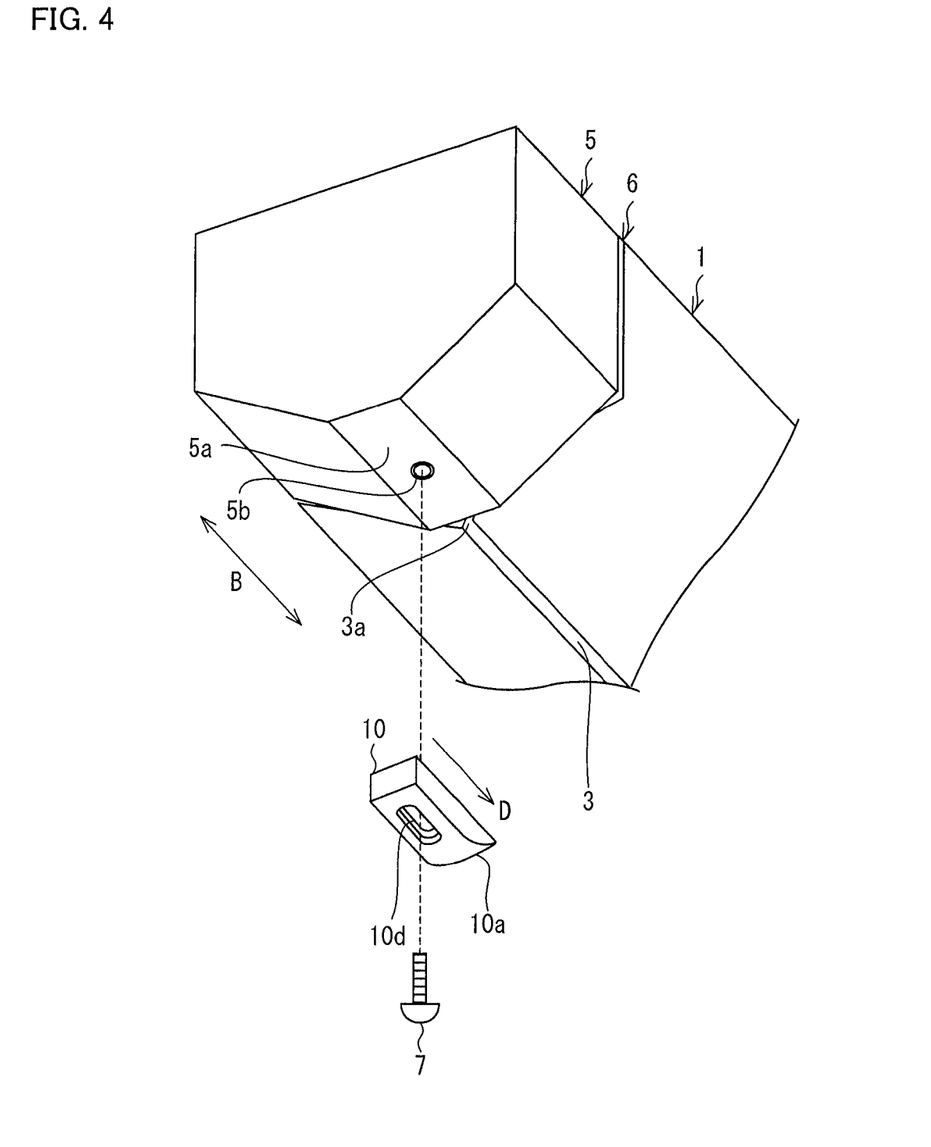
FIG. 4 is an exploded perspective view illustrating how to mount a rectifying jig on the end plate which is included in the film manufacturing apparatus.

The following discusses how to mount the rectifying jig 10 on the end plate 5. FIG. 4 is an exploded perspective view illustrating a method for mounting the rectifying jig 10 on the end plate 5.

The end plate 5 has, as a part of a surface thereof, a jig mounting surface 5a on which to mount the rectifying jig 10 (see FIG. 4). The jig mounting surface 5a is a lower surface of the end plate 5. The end plate 5 has the jig mounting surface 5a so that, when the end plate 5 is mounted on the multilayer extrusion die 1, the jig mounting surface 5a is as high as the lip opening 3 of the multilayer extrusion die 1 and is flush with the lip opening 3. The jig mounting surface 5a is planar so as to be in close proximity to the upper surface 10b of the rectifying jig 10. The jig mounting surface 5a has a bolt hole 5b into which to insert a bolt 7.

Figure 5:
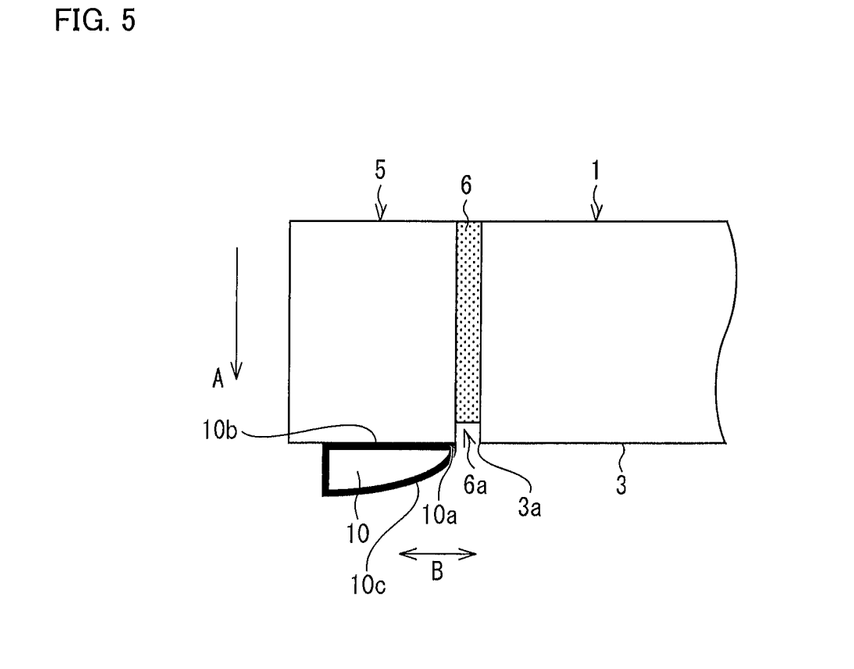
FIG. 5 is an elevation view schematically illustrating a state in which the rectifying jig has been provided at the end in the width direction of the lip opening of the multilayer extrusion die, the width direction corresponding to the width direction of the film (the rectifying jig has not been positionally adjusted).
Figure 6:
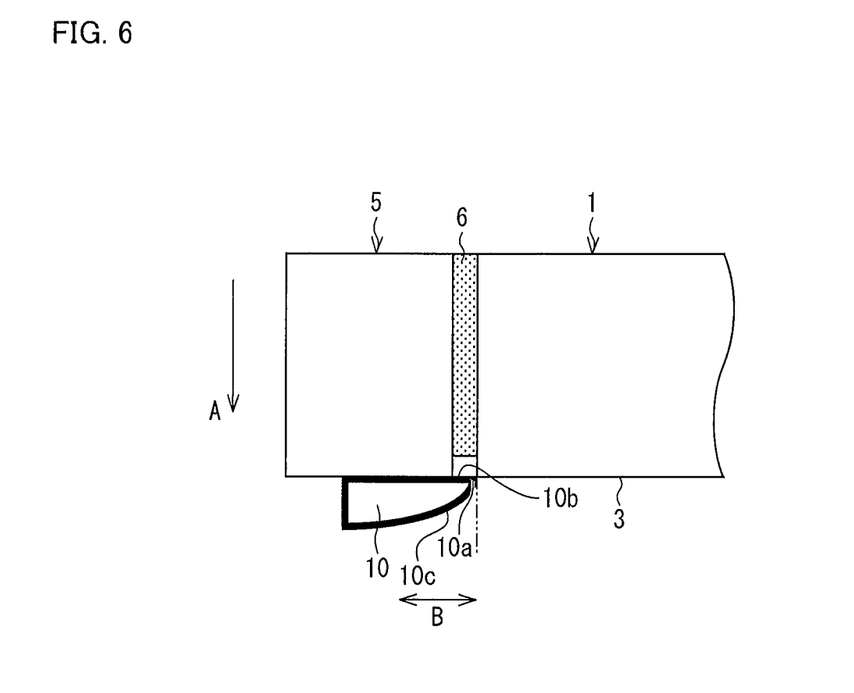
FIG. 6 is an elevation view schematically illustrating a state in which the rectifying jig has been provided at the end in the width direction of the lip opening of the multilayer extrusion die, the width direction corresponding to the width direction of the film, and the rectifying jig has been positionally adjusted.
Figure 7:
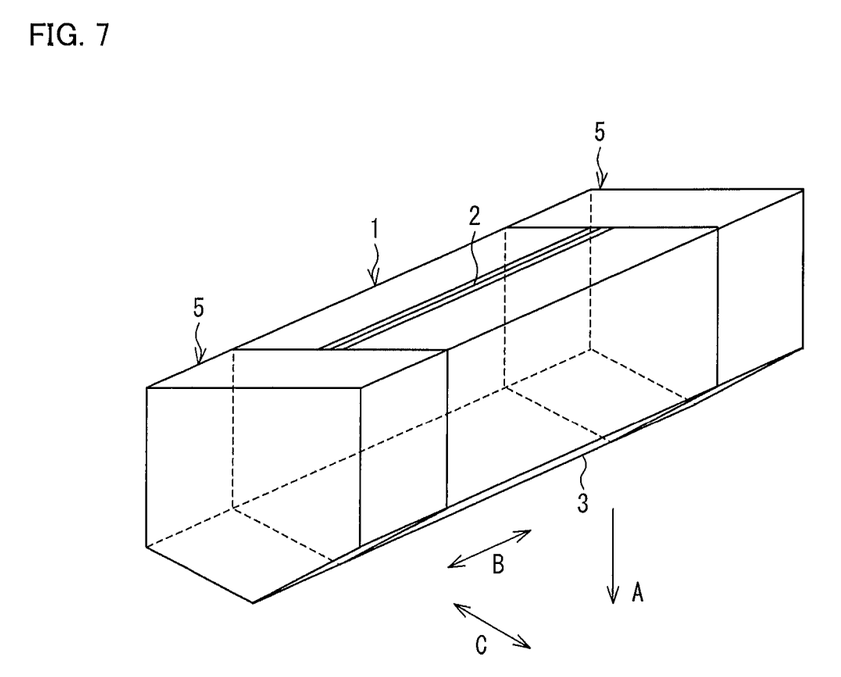
FIG. 7 is a perspective view of another example of the film manufacturing apparatus according to the present invention.

The rectifying jig 10 is mounted on the end plate 5 by inserting the bolt 7 from below into the long hole 10d of the rectifying jig 10 and screwing the bolt 7 into the bolt hole 5b. In this case, the rectifying jig 10 is mounted so that (i) a direction in which the lower surface 10c of the rectifying jig 10 indicates a radius of curvature (the arrow D direction) and (ii) the longer side direction of the lip opening 3 are parallel to each other, and so that the tip 10a of the rectifying jig 10 is directed toward the lip opening 3. FIG. 5 is an elevation view in a case where the rectifying jig 10 is mounted on the end plate 5. In this case, a longer side direction of the long hole 10d into which to insert the bolt 7 is parallel to the longer side direction of the lip opening 3 which is slit-shaped (the arrow B direction in FIG. 5). Therefore, before the bolt 7 is tightened, the rectifying jig 10 is slidable (movable) in the longer side direction of the lip opening 3 (the arrow B direction in FIG. 5 and the width direction corresponding to the width direction of the film). In other words, the tip 10*a* of the rectifying jig 10 can be positionally adjusted with respect to an end (lip edge 3*a*) of the lip opening. For example, the rectifying jig 10 is slid so as to be positionally adjusted with respect to the lip opening 3 after the seal part 6 is provided and the film manufacturing apparatus is formed. Here, the rectifying jig 10 is positionally adjusted so as not to cover the lip opening 3 but to cover the seal part 6 while being located adjacent to the lip edge 3*a*, which is each end, in the longer side direction of the lip opening 3. The rectifying jig 10 which has been positionally adjusted so that the tip 10*a* is located at the end (lip edge 3*a*) of the lip opening 3 is fixed at the location by, for example, tightening the bolt 7. Here, "the tip 10*a* is located at the end (lip edge 3*a*) of the lip opening" means that "the tip 10*a* and the lip edge 3*a* coincide with each other." When the tip 10*a* of the rectifying jig 10 is viewed from a width direction (the arrow C direction in FIG. 1), the tip 10*a* and the lip edge 3*a* coincide with each other to an extent that it can be determined by visual observation that the tip 10*a* and the lip edge 3*a* coincide with each other (see FIG. 6). Note that it can be determined not by visual observation but by use of a measurement apparatus whether or not the tip 10*a* and the lip opening 3*a* coincide with each other (coincide with each other with an error falling within a predetermined range).

Specifically, a mounting position of the rectifying jig 10 needs to be adjusted in accordance with a size and a thickness, or a difference in shape of the seal part 6, or a mounting error occurring while the seal part 6 is being provided. Therefore, the mounting position is adjusted during mounting of the rectifying jig 10. Here, "during mounting of the rectifying jig 10" includes not only a period in which a multilayer film manufacturing apparatus is assembled first and then the rectifying jig 10 is mounted, but also a period in which, after the multilayer extrusion die 1 is rinsed or after the seal part 6 is replaced, the multilayer film manufacturing apparatus is assembled again and then the rectifying jig 10 is mounted. The rectifying jig 10 which is mounted after being positionally adjusted does not need to be positionally adjusted again while the liquid resin a and the liquid resin b are being extruded from the lip opening 3 (while the manufacturing apparatus is operating).

As described earlier, in the upper surface 10*b* of the rectifying jig 10, a line segment (the tip 10*a*) having a length that is not less than the length in the shorter side direction of the lip opening 3 and not more than 10 mm is a part of an outer periphery of the rectifying jig 10, and the upper surface 10*b* of the rectifying jig 10 has a length in a direction perpendicular to the line segment of not less than the thickness of the seal part 6. Therefore, the rectifying jig 10 which moves from the mounting position (position before positional adjustment) (see FIG. 5) to the mounting position (position after positional adjustment) after being positionally adjusted (see FIG. 6) covers the seal part 6 which is provided between the multilayer extrusion die 1 and the end plate 5. In other words, the rectifying jig 10 covers the gap 6*a*.

As described earlier, the film manufacturing apparatus according to the present invention includes the rectifying jig 10 which is mounted on the end plate 5 so that the rectifying jig 10 does not cover the lip opening 3 but covers the seal part 6 while being located adjacent to the each end (lip edge 3*a*) in the longer side direction of the lip opening 3. This prevents the rectifying jigs 10 from covering the lip opening 3. Thus, no pool of the liquid resin is produced in a part of the lip opening 3, the pool being produced in a case where the rectifying jig 10 covers the part. Furthermore, the rectifying jig 10 which can be positionally adjusted with respect to the lip edge 3*a* covers the seal part 6 (seal part 6 provided between the multilayer extrusion die 1 and the end plate 5) while being located adjacent to the lip edge 3*a*. This makes it possible to cover the gap 6*a* which is formed below the seal part 6, so that each end of the liquid resin film which is extruded from the multilayer extrusion die 1 can be made stable in behavior. In other words, the each end of the liquid resin film can be made stable in shape and thicknesses.

The rectifying jig 10 according to the present invention has the upper surface 10*b* in which a line segment (tip 10*a*) having a length that is not less than the length in the shorter side direction of the lip opening 3 and not more than 10 mm is a part of an outer periphery of the rectifying jig 10 and which has a length in a direction perpendicular to the line segment of not less than the thickness of the seal part 6; and the lower surface (second outer surface) 10*c* which is opposite to the upper surface 10*b*. Therefore, in a case where the rectifying jig 10 is mounted on the end plate 5 so that the tip 10*a* is located at the lip edge 3*a*, which is the end of the lip opening 3, and so that the upper surface 10*b* and the jig mounting surface 5*a* of the end plate 5 are in close proximity to each other, while being located adjacent to the lip edge 3*a*, the upper surface 10*b* of the rectifying jig 10 can cover the seal part 6 provided between the multilayer extrusion die 1 and the end plate 5.

Furthermore, the lower surface 10*c* has a rounded part so as to be closer to the tip 10*a*, and the rounded part has a radius of curvature R of more than 0 mm and not more than 10 mm. Therefore, in a case where the rectifying jig 10 is mounted on the end plate 5 so that the tip 10*a* is located at the lip edge 3*a*, which is the end of the lip opening 3, the lower surface 10*c* of the rectifying jig 10 has a rounded part so as to be closer to the lip opening 3. The rounded part has a radius of curvature R of more than 0 mm and not more than 10 mm. This allows the liquid resin film which is ejected from the multilayer extrusion die 1 to be gradually away from the rectifying jig 10 as the ejection from the lip opening 3 is greater in distance. Accordingly, each end of the liquid resin film can be made more stable in behavior.

Therefore, the configuration makes it possible to provide a film which is manufactured stably and continuously and has a good quality.

Note that the above description assumes that the jig mounting surface 5*a* of the end plate 5 and the upper surface 10*b* of the rectifying jig 10 are both planes. However, these surfaces are not limited to the planes provided that the surfaces can be in close proximity to each other. For example, the end plate 5 may have a shape substantially identical to that of the multilayer extrusion die 1 (V-shaped cross section) (see FIG. 7). In this case, the lower surface of the rectifying jig 10 only needs to have a wedge shape which is in close proximity to the jig mounting surface of the end plate 5.

[Film Manufacturing Method]

The following discusses a film manufacturing method according to the present invention which film manufacturing method uses the film manufacturing apparatus having the above configuration. Note that the film manufacturing method according to the present invention is not limited to a method using the film manufacturing apparatus having the above configuration. The film manufacturing method according to the present invention may be any method provided that the method uses a film manufacturing apparatus which includes a rectifying jig provided at each end in a width direction of a lip opening of an extrusion die, the width direction corresponding to a width direction of a film.

Note that the following description of the present embodiment takes, as an example, a case where the film is a multilayer film having a three-layer structure.

A plurality of kinds of liquid resins such as the liquid resin a and the liquid resin b are continuously supplied from a reactor (not illustrated) to the feed opening of the multilayer extrusion die 1 of the film manufacturing apparatus including the rectifying jig 10 which is mounted after being positionally adjusted. an amount of supply per unit time of each of the liquid resin a and the liquid resin b only needs to be appropriately set in accordance with the width and the thickness of the lip opening 3 so that the amount of supply and an amount of extrusion from the lip opening 3 agree with each other.

The supplied liquid resin a and the supplied liquid resin b are continuously extruded from the lip opening 3 in a predetermined width and a predetermined thickness in a form of a liquid resin film having a three-layer structure in which a liquid resin film made of the liquid resin a is sandwiched between liquid resin films made of the liquid resin b. In this case, the film manufacturing method according to the present invention is configured such that each end in a width direction of the lip opening 3, the width direction corresponding to a width direction of a film, that is, the lip edge 3a is provided with the rectifying jig 10 which can be positionally adjusted with respect to the lip edge 3a, and the rectifying jig 10 is positionally adjusted so that the tip 10a of the rectifying jig 10 is located at the lip edge 3a. In other words, the rectifying jig 10 is positionally adjusted so that the rectifying jig 10 does not cover the lip opening 3 but covers the seal part 6 while being adjacent to the each end (lip edge 3a) in the longer side direction of the lip opening 3. Therefore, no pool of the liquid resin is produced in a part of the lip opening, the pool being produced by covering the part. Furthermore, the rectifying jig 10 covers the seal part 6 which is provided between the multilayer extrusion die 1 and the end plate 5, so that each end of the liquid resin film which is extruded from the multilayer extrusion die 1 can be made stable in behavior. In other words, since no pool of the liquid resin due to the gap 6a is produced, the each end of the liquid resin film can be made stable in shape and thicknesses.

The liquid resin film extruded from the multilayer extrusion die 1 and having a three-layer structure is subjected to processes such as a drying process and a calcination process (e.g., imidization of amid acid), and then is formed into a multilayer film having a three-layer structure.

According to the above method, since the rectifying jig 10 can cover the seal part 6 which is provided between the end plate 5 and the multilayer extrusion die 1 (that is, can cover the gap 6a), each end of the liquid resin film which is extruded from the multilayer extrusion die 1 can be made stable in behavior. In other words, each end of the liquid resin film can be made stable in shape and thickness. Therefore, the method makes it possible to provide a film manufacturing method which enables stable and continuous production of a multilayer film while maintaining a quality of the multilayer film.

Moreover, the film according to the present invention is manufactured by use of the multilayer extrusion die 1 in which each end in a width direction of the lip opening 3 of the multilayer extrusion die 1, the width direction corresponding to a width direction of a multilayer film, that is, the lip edge 3a is provided with the rectifying jig 10 which can be positionally adjusted with respect to the lip edge 3a, and in which the tip 10a of the rectifying jig 10 which tip 10a faces the lip opening coincides with the lip edge 3a. Therefore, it is possible to provide a multilayer film which is continuously manufactured more stably and has a good quality.

The following discusses a resin which is formed into a film in the present embodiment. Various kinds of publicly known resins can be used as liquid resins to be supplied to the feed opening 2 of the multilayer extrusion die 1. According to the present invention, the film is favorably formed by a solution casting method in which a resin solution is used to be extruded and cast. A liquid resin which is subjected to film formation by the solution casting method is favorably at least one solution selected from the group consisting of a polyamide imide solution, a polyimide solution, and a polyamide acid solution which is a precursor of polyimide. It is particularly favorable to use the polyamide acid solution which is a precursor of polyimide. In this case, the polyamide acid solution only needs to be supplied to the feed opening 2 of the multilayer extrusion die 1. Note that the polyamide solution may contain a chemical imidization agent as a curing agent.

Note also that a film for a printed wiring board having a surface plated with copper or a film for a printed wiring board used with its surface pasted with copper foil is favorably made of a thermoplastic polyimide resin from the viewpoint of excellence in adhesion with a metal plated layer or copper foil. However, only the thermoplastic polyimide resin is insufficient because the thermoplastic polyimide resin softens at a high temperature and then fails to have a self-supporting property. This makes it necessary for the thermoplastic polyimide resin to be combined with a non-thermoplastic resin serving as a support. Therefore, it is favorable to manufacture a film having a three-layer structure and made of a thermoplastic polyimide resin, a non-thermoplastic polyimide resin, and a thermoplastic polyimide resin. In this case, it is only necessary that a polyamide acid solution which is a precursor of non-thermoplastic polyimide be supplied to an inner resin flow path provided between a pair of inner plates and that a polyamide acid solution which is a precursor of thermoplastic polyimide be supplied to two outer resin flow paths provided between an inner plate and an outer plate.

Here, the thermoplastic polyimide resin is a polyimide resin which is subjected to permanent compressive deformation in a temperature range of 10° C. to 400° C. (the rate of temperature increase: 10° C./min) in thermomechanical analysis (TMA) in a compression mode (probe diameter: 3 mm in diameter, load: 5 grams). Meanwhile, the non-thermoplastic polyimide resin is a polyimide resin which is not subjected to permanent compressive deformation in the temperature range of 10° C. to 400° C. (the rate of temperature increase: 10° C./min) in thermomechanical analysis (TMA) in the compression mode (probe diameter: 3 mm in diameter, load: 5 grams). Note that whether to make a polyimide resin thermoplastic or non-thermoplastic can be selected by adjusting a composition of the polyimide resin.

The following discusses a polyimide film manufacturing method. A polyimide film is manufactured by using, as a precursor, a polyamide acid solution (hereinafter, the term "polyamide acid" is herein sometimes used as a synonym of a polyimide precursor). A usable polyamide acid manufacturing method is exemplified by, but not particularly limited to various publicly-known methods. For example, normally, a polyamide acid organic solvent solution is obtained by dissolving a dianhydride component and a diamine component in an organic solvent in substantially equimolar amounts. Then, the polyamide acid organic solvent solution thus obtained is stirred under a controlled temperature condition until polymerization of the dianhydride component and the diamine component is completed, so that a polyamide acid solution can be manufactured. The polyamide acid solution can be obtained at a concentration of 5 wt % to 35 wt %, and favorably of 10 wt % to 30 wt %. The polyamide acid solution at a concentration falling within the above range can have a suitable molecular weight and a suitable solution viscosity.

A usable method for polymerizing the dianhydride component and the diamine component is exemplified by, but not particularly limited to various publicly known methods and a combination of such methods. Note that a characteristic feature of a method for polymerization of polyamide acid is exemplified by an order in which to add monomers. In a case where the order in which to add monomers is adjusted, it is possible to control various properties of polyimide to be obtained.

According to the present invention, any method for adding monomers may be used in polymerization of polyamide acid. A typical method for polymerizing polyamide acid is exemplified by, but not particularly limited to:

1) a method for polymerizing polyamide acid by dissolving aromatic diamine in a polar organic solvent and causing a reaction to occur between the resulting solution and aromatic tetracarboxylic dianhydride that is substantially equal in mole to the aromatic diamine;

2) a method for polymerizing polyamide acid by (i) obtaining a prepolymer having an anhydride group at each terminal thereof by causing a reaction to occur in a polar organic solvent between aromatic tetracarboxylic dianhydride and an aromatic diamine compound having fewer moles than the aromatic tetracarboxylic dianhydride, and subsequently (ii) using an aromatic diamine compound so that the aromatic tetracarboxylic dianhydride and the aromatic diamine compound are substantially equimolar in all steps;

3) a method for polymerizing polyamide acid by (i) obtaining a prepolymer having an amino group at each terminal thereof by causing a reaction to occur in a polar organic solvent between aromatic tetracarboxylic dianhydride and an aromatic diamine compound having more moles than the aromatic tetracarboxylic dianhydride, and subsequently (ii) further adding an aromatic diamine compound to the prepolymer and then using the aromatic tetracarboxylic dianhydride so that the aromatic tetracarboxylic dianhydride and the aromatic diamine compound are substantially equimolar in all steps;

4) a method for polymerizing polyamide acid by dissolving and/or dispersing aromatic tetracarboxylic dianhydride in a polar organic solvent, and then using an aromatic diamine compound so that the aromatic tetracarboxylic dianhydride and the aromatic diamine compound are substantially equimolar; and 5) a method for polymerizing polyamide acid by causing a reaction, in a polar organic solvent, of a mixture of aromatic tetracarboxylic dianhydride and aromatic diamine that are substantially equimolar.

These methods can be used alone or in partial combination of two or more methods.

Examples of the diamine component include: 4,4'-diaminodiphenyl propane; 4,4'-diaminodiphenylmethane; 4,4'-diaminodiphenyl sulfide; 3,3'-diaminodiphenyl sulfone; 4,4'-diaminodiphenyl sulfone; 4,4'-oxydianiline; 3,3'-oxydianiline; 3,4'-oxydianiline; 4,4'-diaminodiphenyl diethyl silane; 4,4'-diaminodiphenyl silane; 4,4'-diamino diphenyl ethyl phosphine oxide; 4,4'-diaminodiphenyl N-methylamine; 4,4'-diaminodiphenyl N-phenylamine; 1,4-diaminobenzene (p-phenylenediamine); bis{4-(4-aminophenoxy)phenyl}sulfone; bis{4-(3-aminophenoxy)phenyl}sulfone; 4,4'-bis(4-aminophenoxy)biphenyl; 4,4'-bis(3-aminophenoxy)biphenyl; 1,3-bis(3-aminophenoxy)benzene; 1,3-bis(4-aminophenoxy)benzene; 1,4-bis(4-aminophenoxy)benzene; 1,3-bis(3-aminophenoxy)benzene; 3,3'-diaminobenzophenone; 4,4'-diaminobenzophenone; 2,2'-dimethyl-4,4'-diaminobiphenyl; 2,2-bis(4-aminophenoxyphenyl)propane; 3,3'-dihidroxy-4,4'-diamino-1,1'-biphenyl; 4,4'-oxydianiline; 1,3-bis(4-aminophenoxy)benzene; 3,4'-oxydianiline; 1,4-diaminobenzene (p-phenylenediamine); and 2,2-bis[4-(4-aminophenoxy)phenyl]propane.

Examples of a component that is suitably used as the dianhydride component include: pyromellitic dianhydride; 2,3,6,7-naphthalenetetracarboxylic dianhydride; 3,3',4,4'-benzophenonetetracarboxylic dianhydride; 2,2',3,3'-biphenyltetracarboxlyic dianhydride; 3,3',4,4'-biphenyltetracarboxylic dianhydride; 2,2-bis(3,4-dicarboxyphenyl)propane dianhydride; p-phenylenebis(trimellitic acid monoester acid anhydride); and 4,4'-oxydiphthalic dianhydride. These components can be used alone or in combination of two or more kinds.

Any solvent is usable as a suitable solvent for synthesizing polyamide acid and is not particularly limited, provided that the solvent can dissolve polyamide acid. Examples of the solvent include amide solvents, i.e., N,N-dimethylformamide, N,N-dimethylacetamide, N-methyl-2-pyrrolidone, and the like. Of these solvents, N,N-dimethylformamide and N,N-dimethylacetamide are particularly favorably usable.

Note that it is possible to add a filler to the polyimide film so as to improve various film properties such as slidability, thermal conductivity, electroconductivity, corona resistance, and loop stiffness. Any filler can be used, and examples of a favorable filler include silica, titanium oxide, alumina, silicon nitride, boron nitride, calcium hydrogen phosphate, calcium phosphate, and mica.

There are various methods each of which is usable as a method for making the polyimide film from the polyamide acid solution, and the method is not limited to a particular method. Examples of the method include a thermal imidization method and a chemical imidization method. The film may be made by either of these methods.

Note that a process for manufacturing a polyimide film that is particularly favorable in the present invention favorably includes the steps of:

i) obtaining a polyamide acid solution by causing a reaction to occur in a polar organic solvent between aromatic diamine and aromatic tetracarboxylic dianhydride;

ii) casting and extending, on an endless belt, a film-forming dope containing the polyamide acid solution;

iii) heating the film-forming dope on the endless belt and then ripping a gel film out of the endless belt; and iv) further heating the gel film, imidizing the remaining amide acid, and drying the gel film.

Here, the step (ii) corresponds to an extrusion step of extruding the polyamide acid solution from the lip opening 3 of the multilayer extrusion die 1 so as to form a film.

In the above step, it is possible to use a curing agent which contains (i) a dehydrator typified by acid anhydride such as acetic anhydride, and (ii) an imidization catalyst typified by tertiary amines such as isoquinoline, quinoline, β-picoline, pyridine, and diethyl pyridine.

As described earlier, the film manufacturing apparatus according to the present embodiment includes the rectifying jig 10 which is mounted on the end plate 5 so that the rectifying jig 10 does not cover the lip opening 3 but covers the seal part 6 while being located adjacent to the each end (lip edge 3*a*) in the longer side direction of the lip opening 3. This prevents production of a pool of the resin solution in a part of the lip opening 3, the pool being produced in a case where the rectifying jig 10 covers the part. Furthermore, since it is possible to cover the gap 6*a* which is formed below the seal part 6, each end of the liquid resin film which is extruded from the multilayer extrusion die 1 can be made stable in behavior without a pool of the resin solution in the gap 6*a*. Since a pool of the resin solution can thus be prevented, the manufacturing method using the film manufacturing apparatus according to the present embodiment makes it possible to cast and dry a film while an end of the film is stable in shape during continuous production, and to stably manufacture the film while preventing a drop of the film from a carrying jig (e.g., a pin) due to a change in shape of the end of the film. Furthermore, the manufacturing method is particularly suitable for a method for forming a film by extruding a resin solution to which a curing agent for curing a resin is added. Such a resin solution is exemplified by a resin solution to which a chemical imidization agent as a curing agent is added to a polyamide acid solution. This resin solution cures as time elapses. Thus, if the resin solution pools at each end of the multilayer extrusion die 1, the resin solution having pooled becomes agglomerate, and the agglomerate gradually adheres to the liquid resin film. This causes the liquid resin film to have a non-uniform thickness at each end of the liquid resin film, or causes the film to have an irregular shape, so that the film may be difficult to continuously produce. However, since the film manufacturing method according to the present embodiment makes it possible to prevent a pool of the resin solution, the film can be continuously produced also in a case where the film is manufactured by extruding a resin solution to which a curing agent is added.

In a case where a resin film (e.g., a polyimide film) having a multilayer structure (e.g., a three-layer structure) is formed and a resin pool is produced at an end of the resin film, the resin film may be cast while a film thickness ratio of the multilayer structure is periodically changing. This easily causes a change in shape of the end, so that a problem such as a drop from a carrying jig (e.g., a pin) may occur. However, since the film manufacturing method according to the present embodiment makes it possible to prevent a pool of a resin solution, it is possible to make the end stable in shape and stably carry the film. Furthermore, in a case where a resin film (e.g., a polyimide film) having a multilayer structure (e.g., a three-layer structure) is formed, there may be a layer to which a curing agent (e.g., a chemical imidization agent) is added and a layer to which no curing agent is added. In this case, if a liquid resin pools at each end of the multilayer extrusion die 1, a film thickness ratio changes at the end of the resin film, and a resin partially remains on a substrate due to a variation in easiness of separation from the substrate that has been cast, so that the film may be difficult to continuously produce. However, since the film manufacturing method according to the present embodiment makes it possible to prevent a pool of a resin solution, it is possible not only to make the end stable in shape and stably carry the film but also to stably and continuously produce the film also in the case of manufacturing a resin film having a multilayer structure and including a layer to which a curing agent is added and a layer to which no curing agent is added.

[Others]

The present invention can also be expressed as below. That is, a multilayer film manufacturing method according to the present invention, which multilayer film manufacturing method is a multilayer film manufacturing method using a multilayer extrusion die, is configured such that a rectifying jig for a multilayer film is provided at each end in a width direction of a lip opening of the multilayer extrusion die, the width direction corresponding to a width direction of a multilayer film.

The multilayer film manufacturing method according to the present invention is more favorably configured such that the rectifying jig, which can be positionally adjusted with respect to the each end, causes a tip of the rectifying jig which tip faces the lip opening to coincide with the each end of the lip opening. The multilayer film manufacturing method according to the present invention is more favorably configured such that the tip of the rectifying jig has R of more than 0 mm and not more than 10 mm. The multilayer film manufacturing method according to the present invention is more favorably configured such that a width of the tip of the rectifying jig is not less than a thickness of the lip opening which thickness corresponds to a thickness direction of the multilayer film and not more than 10 mm. Note here that the "width of the tip" refers to a length of the tip which coincides with a lip edge.

According to the configuration, the rectifying jig for a multilayer film is provided at the each end in the width direction of the lip opening of the multilayer extrusion die, the width direction corresponding to the width direction of the multilayer film, and more favorably, the rectifying jig, which can be positionally adjusted with respect to the each end, causes the tip of the rectifying jig which tip faces the lip opening to coincide with the each end of the lip opening. This allows the rectifying jig to cover a gap or a level difference appearing at, for example, the end. Therefore, each end of a liquid resin film extruded from the multilayer extrusion die can be made stable in behavior. That is, the each end of the liquid resin film can be made stable in shape and thickness.

Therefore, the configuration makes it possible to provide a multilayer film manufacturing method which enables stable and continuous production of a multilayer film while maintaining a quality of the multilayer film.

A multilayer film according to the present invention is manufactured by use of the multilayer extrusion die in which the rectifying jig for a multilayer film is provided at the each end in the width direction of the lip opening of the multilayer extrusion die, the width direction corresponding to the width direction of the multilayer film, the rectifying jig being positionally adjustable with respect to the each end, and the tip of the rectifying jig which tip faces the lip opening coincides with the each end of the lip opening.

A rectifying jig for a multilayer film according to the present invention, the rectifying jig being a rectifying jig for a multilayer film which rectifying jig is provided in a multilayer extrusion die, is configured such that a tip of the rectifying jig which tip faces a lip opening of the multilayer extrusion die and which tip is positionally adjusted with respect to an end in a width direction of the lip opening of the multilayer extrusion die, the width direction corresponding to a width direction of the multilayer film, has R of more than 0 mm and not more than 10 mm.

The rectifying jig is more favorably configured such that the tip has a width that is not less than a thickness of the lip opening and not more than 10 mm.

The configuration makes it possible to provide a multilayer film which is manufactured stably and continuously and has a good quality.

EXAMPLES

Examples of the present invention are described below. Note, however, that the present invention is not limited to configurations according to the Examples as described below.

Synthesis Example 1

In the present synthesis example, 9.2 kg of 4,4'-oxydianiline (ODA) and 28.3 kg of 2,2-bis[4-(4-aminophenoxy)phenyl]propane (BAPP) were dissolved in 582 kg of N,N-dimethylformamide (DMF). After 14.8 kg of 3,3',4,4'-benzophenonetetracarboxylic dianhydride (BTDA) was added to the resulting solution and dissolved in the solution, 12.6 kg of pyromellitic dianhydride (PMDA) was added to the resulting solution and dissolved in the solution by stirring for one hour. Then, after 12.44 kg of paraphenylenediamine (PDA) was added to the resulting solution and dissolved in the solution, 26.6 kg of PMDA was further added to the resulting solution and dissolved in the solution by stirring for one hour.

To the solution thus obtained, a separately prepared DMF solution of PMDA (PMDA:DMF=1.5 kg:19.4 kg) was gradually added. Then, the addition of the DMF solution was stopped when a viscosity of the resulting solution reached approximately 2500 poise. Thereafter, the resulting solution was stirred for one hour, so that a polyamide acid solution (1) (a polyamide acid solution which is a precursor of non-thermoplastic polyimide) was obtained, the polyamide acid solution (1) having a solid content concentration of 18 wt % and a viscosity of 2500 poise at a temperature of 23° C.

Synthesis Example 2

After 62.1 kg of BAPP was dissolved in 642 kg of DMF, 58.5 kg of 3,3',4,4'-biphenyltetracarboxylic dianhydride (BPDA) was gradually added to the resulting solution and dissolved in the solution. Subsequently, 17.0 kg of BAPP was added to the resulting solution and dissolved in the solution by stirring for one hour.

To the solution thus obtained, a separately prepared DMF solution of BAPP (BAPP:DMF=4.1 kg:54.2 kg) was gradually added. Then, the addition of the DMF solution was stopped when a viscosity of the resulting solution reached approximately 1000 poise. Thereafter, the resulting solution was stirred for one hour, so that a polyamide acid solution (2) (a polyamide acid solution which is a precursor of thermoplastic polyimide) was obtained, the polyamide acid solution (2) having a solid content concentration of 17 wt % and a viscosity of 1000 poise at a temperature of 23° C.

Synthesis Example 3

After 68.4 kg of BAPP was dissolved in 737 kg of DMF, 99.3 kg of PMDA was gradually added to the resulting solution and dissolved in the solution. Subsequently, 11.3 kg of PDA was added to the resulting solution and dissolved in the solution by stirring for one hour.

To the solution thus obtained, a separately prepared DMF solution of PDA (PDA:DMF=1.97 kg:37.4 kg) was gradually added. Then, the addition of the DMF solution was stopped when a viscosity of the resulting solution reached approximately 2500 poise. Thereafter, the resulting solution was stirred for one hour, so that a polyamide acid solution (3) (a polyamide acid solution which is a precursor of non-thermoplastic polyimide) was obtained, the polyamide acid solution (3) having a solid content concentration of 18 wt % and a viscosity of 2500 poise at a temperature of 23° C.

Example 1

A rectifying jig was mounted on a three-layer co-extrusion die of a manufacturing apparatus which manufactures a multilayer film having a three-layer structure in which a non-thermoplastic resin film is sandwiched between thermoplastic resin films. The rectifying jig had a tip whose R is 5 mm, a width of 7 mm, and a height of 5 mm. The rectifying jig was positionally adjusted so that the tip and a lip edge coincided with each other (see FIG. 6).

To the polyamide acid solution (1) obtained in Synthesis Example 1, a curing agent prepared by mixing 54 kg of DMF, 43 kg of isoquinoline, and 403 kg of acetic anhydride was continuously added at a weight ratio of 40% relative to the polyamide acid solution (1). Then, the resulting solution was stirred by use of a mixer, and thereafter the liquid resin thus obtained was supplied to a central layer of the three-layer co-extrusion die. Meanwhile, to the polyamide acid solution (2) obtained in Synthesis Example 2, DMF was added. Then, a solid content concentration of the resulting solution was adjusted to 14 wt %, and thereafter the liquid resin thus obtained was supplied to both sides of the central layer of the three-layer co-extrusion die.

Subsequently, the both of the liquid resins were extruded from a lip opening of the three-layer co-extrusion die which lip opening had a thickness adjusted to 1.3 mm (that is, the lip opening having a length in a shorter side direction of 1.3 mm), and this liquid resin film was dried on a stainless endless belt at a temperature of 130° C. for 100 seconds, so that a gel film having a self-supporting property was obtained. After the gel film was ripped out of the endless belt, both ends of the gel film were fixed with a pin. Then, the gel film was dried and imidized under heating conditions of 300° C.×20 seconds, 450° C.×20 seconds, and 500° C.×20 seconds, so that a polyimide film having a three-layer structure was obtained.

Then, the film having a three-layer structure was produced continuously for not less than seven days. After the elapse of seven days from the start of the production, no pool of a liquid resin was produced in a space between the lip edge and an end plate. Further, the produced film having a three-layer structure had a uniform thickness and a good quality.

Example 2

To the polyamide acid solution (3) obtained in Synthesis Example 3, a curing agent prepared by mixing 293 kg of DMF, 42 kg of isoquinoline, and 163 kg of acetic anhydride was continuously added at a weight ratio of 50% relative to the polyamide acid solution (3). Then, the resulting solution was stirred by use of a mixer, and thereafter the liquid resin thus obtained was supplied to a central layer of the three-layer co-extrusion die. Meanwhile, to the polyamide acid solution (2) obtained in Synthesis Example 2, DMF was added. Then, a solid content concentration of the resulting solution was adjusted to 14 wt %, and thereafter the liquid resin thus obtained was supplied to both sides of the central layer of the three-layer co-extrusion die.

Subsequently, a polyimide film having a three-layer structure was obtained as in the case of Example 1 by using a manufacturing apparatus which was identical to that used in Example 1.

Then, the film having a three-layer structure was produced continuously for not less than seven days. After the elapse of seven days from the start of the production, no pool of a liquid resin was produced in a space between the lip edge and an end plate. Further, the produced film having a three-layer structure had a uniform thickness and a good quality.

As is clear from results of Examples 1 and 2, the manufacturing method according to the present invention enabled stable and continuous production of a multilayer film.

Comparative Example 1

Figure 2:
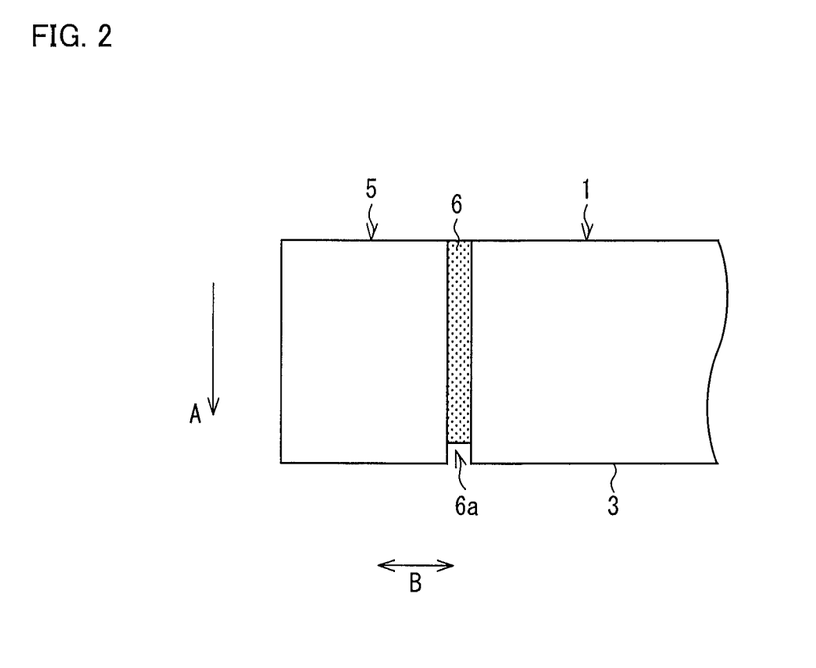
FIG. 2 is an elevation view schematically illustrating a state in which a level difference (a groove) appears between (i) an end in a width direction of a lip opening of a multilayer extrusion die which is included in the film manufacturing apparatus, the width direction corresponding to a width direction of a film, and (ii) an end plate.

A multilayer film having a three-layer structure was continuously produced as in the case of Example 1 by using a manufacturing apparatus which was identical to that used in Example 1 but was different in that the manufacturing apparatus used in Comparative Example 1 was provided with no rectifying jig (see FIG. 2).

However, after the elapse of two days from the start of the production, a pool of a liquid resin was produced in a space between a lip edge and an end plate, and a part of the pool of the liquid resin cured to be agglomerate. The agglomerate, which was in contact with an end of a liquid resin film extruded from a three-layer co-extrusion die, makes a flow of the liquid resin unstable. This makes each end of the liquid resin film unstable in shape and thickness. Furthermore, a part of the agglomerate adhered as a foreign matter to the liquid resin film, and a produced film having a three-layer structure had a poor quality.

Therefore, the manufacturing apparatus which was provided with no rectifying jig made it impossible to stably and continuously produce a multilayer film.

INDUSTRIAL APPLICABILITY

A manufacturing method according to the present invention, for example brings about an advantageous effect of providing (i) a film manufacturing method, (ii) a film manufacturing apparatus, and (iii) a jig each of which enables stable and continuous production of a film while maintaining a quality of the film.

Therefore, the manufacturing method according to the present invention, for example can be widely used in various industries each of which uses a method for manufacturing a film such as a multilayer polyimide film.

REFERENCE SIGNS LIST

1 Multilayer extrusion die
2 Feed opening
3 Lip opening
3a Lip edge
5 End plate
6 Seal part
6a Gap
10 Rectifying jig (jig)
10a Tip
10b Upper surface (first outer surface)
10c Lower surface (second outer surface)

The invention claimed is:
1. A film manufacturing method using a film manufacturing apparatus,
the film manufacturing apparatus including:
an extrusion die having a feed opening for supplying a resin and a lip opening for ejecting the supplied resin in a form of a film;
the extrusion die having opposing lip edges defining a width of the lip opening;
an end plate which is provided at each end in a longer side direction of the lip opening of the extrusion die and serves as a sidewall of the lip opening;
a seal part which is provided between the extrusion die and the end plate and having a seal part end surface, wherein the seal part end surface, opposing lip edges of the extrusion die and the end plate at the lip opening are not flush with each other, thereby providing a gap between the opposing lip edges of the extrusion die and the end plate at the lip opening; and
a jig movably mounted on the end plate so as to cover the gap between the opposing lip edges of the extrusion die and the end plate at the lip opening and to not cover the opposing lip edges of the extrusion die,
said film manufacturing method comprising:
an extrusion step of, in a state in which the jig is mounted on the end plate so as to cover the gap between the opposing lip edges of the extrusion die and the end plate at the lip opening and to not cover the opposing lip edges of the extrusion die, extruding the resin from the lip opening so as to form the film.

2. The film manufacturing method as set forth in claim 1, wherein the jig has a tip that faces the extrusion die, the tip being located at the opposing lip edges of the extrusion die.

3. The film manufacturing method as set forth in claim 1, wherein the jig has a first outer surface that faces the end plate and a second outer surface that is opposite to the first outer surface and has a rounded part so as to be closer to the lip opening, the rounded part having a radius of curvature R of more than 0 mm and not more than 10 mm.

4. The film manufacturing method as set forth in claim 1, wherein the jig has a tip that faces the lip opening, the tip having a width that is not less than a length in a shorter side direction of the lip opening and not more than 10 mm.

5. The film manufacturing method as set forth in claim 1, wherein the resin is at least one resin selected from the group consisting of a polyimide solution, a polyamide imide solution, and a polyamide acid solution which is a precursor of polyimide.

6. The film manufacturing method as set forth in claim 5, wherein:
the resin is the polyamide acid solution which is a precursor of polyimide; and
the polyamide acid solution contains a chemical imidization agent.

7. The film manufacturing method as set forth in claim 1, wherein:
the extrusion die has a plurality of resin flow paths from the feed opening to the lip opening; and
in the extrusion step, a multilayer resin film is formed by supplying the resin separately to each of the plurality of resin flow paths, causing the separately supplied resin to flow together, and ejecting the resin from the lip opening.

8. The film manufacturing method as set forth in claim 1, wherein:
the extrusion die has three resin flow paths from the feed opening to the lip opening; and
in the extrusion step, a resin film having a three-layer structure is formed by supplying, to one of the three resin flow paths which one is inner than the other two resin flow paths, a polyamide acid solution which is a precursor of non-thermoplastic polyimide, and by supplying, to the other two resin flow paths which are outer than the one of the three resin flow paths, a polyamide acid solution which is a precursor of thermoplastic polyimide.

* * * * *